May 6, 1969   F. M. NASH   3,442,385
FILTER ASSEMBLY INCLUDING A FLOAT SUPPORTED, COLLAPSIBLE
FILTER ELEMENT
Filed May 16, 1966
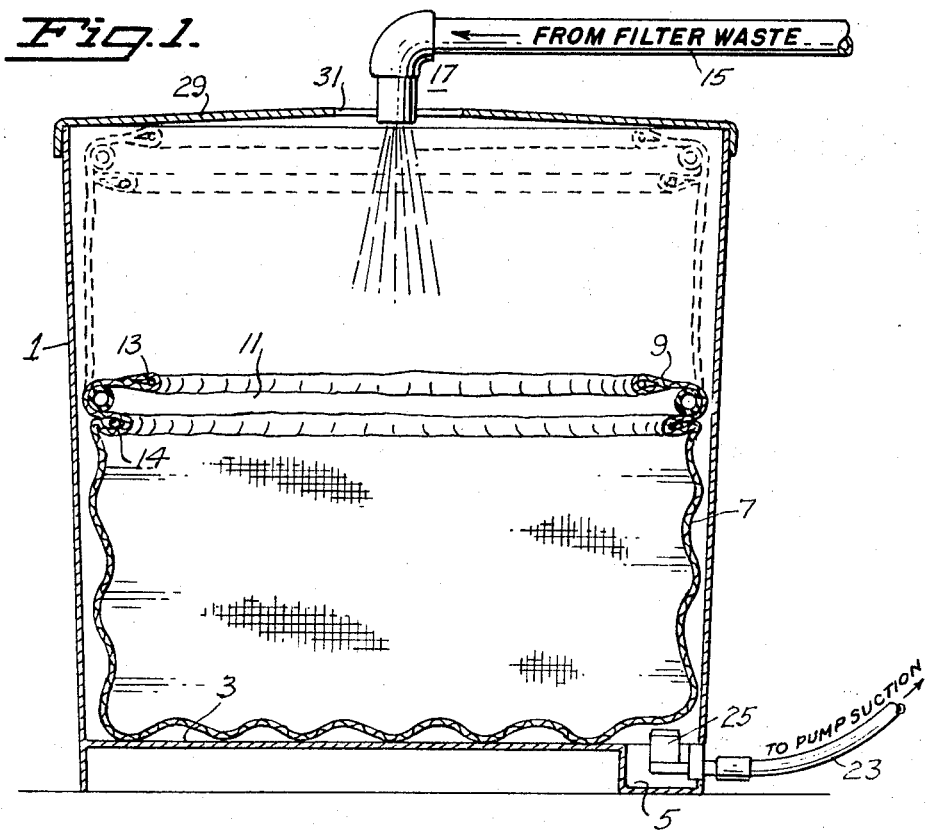
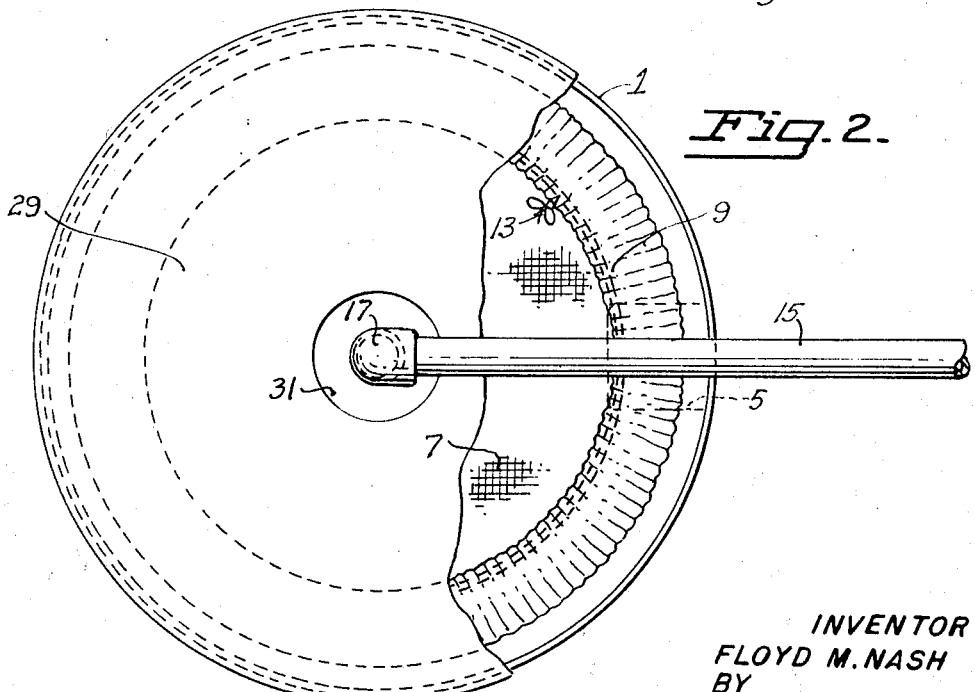
INVENTOR
FLOYD M. NASH
BY
WARREN, BROSLER, CYPHER & ANGLIM
ATTORNEYS

United States Patent Office 3,442,385
Patented May 6, 1969

3,442,385
FILTER ASSEMBLY INCLUDING A FLOAT SUPPORTED, COLLAPSIBLE FILTER ELEMENT
Floyd M. Nash, Little Rock, Ark., assignor to Jacuzzi Bros., Incorporated, a corporation of California
Filed May 16, 1966, Ser. No. 550,233
Int. Cl. B01d 23/20
U.S. Cl. 210—109                                6 Claims

ABSTRACT OF THE DISCLOSURE

A filter assembly for filtering backwash water of a swimming pool system, comprising a tank to receive the backwash water, and a filter element in the tank, in the form of a sack having a float ring affixed thereto about the mouth of the sack, and a float valve in a sump located in the floor of the tank.

---

My invention relates to swimming pool equipment and more particularly to a backwash tank assembly for a swimming pool system or the like.

In a conventional pool system, water draining from a pool is pumped through a filter and back to the pool as clean filtered water. After a period of time, the sediment removed by the filter tends to clog the filter and impair its filtering ability, thus necessitating a backwash of the filter to remove such sediment and prepare the filter for another filtering cycle.

It is conventional practice in this connection to reverse the flow through the filter by means of a multiple control valve usually mounted on the filter, the dirty wash water emerging from the filter, being directed to a sewer drain or some other channel for carrying off the discharge. Water thus lost from the system is replaced by adding to the pool, water from a fresh source.

Aside from the necessity of providing a drain connection to a sewer or other waste discharge channel, the backwash water thus discharged from the system, not only represents a loss of water, but a loss of water which has previously been treated by chlorination for use in the pool system, thus necessitating additional chemical treatment represented by such loss. And if the pool happens to be a heated pool, additional heating must be provided to replace the heat which would not otherwise be lost.

Accordingly, if such backwash water can be reclaimed, it will effect a substantial savings to the pool owner and attempts have been made in this direction.

Among the objects of my invention are:
(1) To provide a novel and improved means for recovering backwash water in a pool system;
(2) To provide a novel and improved backwash tank assembly for recovering backwash water in a pool system;
(3) To provide a novel and improved backwash tank assembly employing filter means which is fully exposed to backwash water, regardless of the quantity of such water in the tank;
(4) To provide a novel and improved backwash tank assembly which is simple in structure and operation, and may be readily installed in a system;
(5) To provide a novel and improved backwash tank assembly in which the filter means may be readily removed and cleaned, and which may even be laundered if desired;
(6) To provide a novel and improved backwash tank assembly having means for protecting a connected pump against loss of prime; and
(7) To provide a novel and improved backwash tank assembly in which the filter means may be dried before removal, to facilitate handling and cleaning.

Additional objects of my invention will be brought out in the following description of a preferred embodiment of the same, taken in conjunction with the accompanying drawings wherein:

FIGURE 1 is a vertical view in section through a backwash tank assembly of the present invention; and FIGURE 2 is a plan view of the tank assembly of FIGURE 1 with a portion of the cover broken away.

Referring to the drawings for details of my invention in its preferred form, the same involves a tank 1, preferably of cylindrical form, having an elevated bottom 3 with a sump 5 associated therewith, to provide a low point in the tank. Since the tank is of the open type, it can be constructed of comparatively light material such as plastic or light gauge steel.

The elevated bottom 3 provides a rest means for a filter sack 7 of a diameter approaching the diameter of the tank, to support the lower end of such sack above the low point in the receptacle provided by the sump.

At the mouth end 9 of the bag, I provide float means 11 adapted to cause the sack to unfurl or collapse with changing water level in the tank. While various types of float means may be provided, I prefer to utilize a hollow tube insertable within the mouth end of the bag and adapted to be retained therein by providing this end of the bag with a drawstring 13 which will permit the edge of the sack to be drawn in over the float ring to retain the same, subject to its ready removal by loosening the drawstring.

A similar drawstring 14 may also be provided just below the portion to be occupied by the float ring to assure proper functioning of the float ring.

With a sack having a length approaching the height of the tank, it is thus capable of unfurling to substantially the capacity of the tank, from a position of collapse on the floor of the tank.

A discharge line 15 from the filter to be backwashed, terminates above the tank in a nozzle assembly 17, preferably on the central axis thereof of the tank, whereby the filter backwash water will discharge into the tank and cause the filter sack to unfurl with rising water level therein. Inasmuch as such backwash water is heavy with sediment, some of this sediment will tend to settle to the bottom of the sack, while some will be filtered from the water passing through the walls of the sack.

The water as thus filtered is connected to the suction end of the pool system pump (not shown) through a valve controlled suction line 23, such suction line emerging from the tank at the low point represented by the sump, wherein a float controlled valve 25 is mounted to expose the pump suction line 23 to such filtered backwash water when said valve is submerged, but which will block such line before the water level in the sump drops to a point, where the suction line will be exposed to atmosphere. Thus the float controlled valve will preclude the intake of air into the pump and cause loss of prime when the backwash tank is empty.

For best performance, the tank should have a capacity sufficient to receive the entire flow of backwash water for any particular backwash cycle, which for a filter having a filter rate of 60 gallons per minute and a backwash rate of 45 gallons per minute, would call for a backwash tank having a capacity of approximately 90 gallons.

During a backwash operation, it will be understood that the suction end of the pump will remain connected to the pool drain, but by means of adjustment of the multiple control valve on the filter, the flow through the filter will be reversed, at the same time disconnecting the return line to the pool and causing the reverse flow to exit from the filter at the backwash outlet, which, in accordance with the present invention, is directed to the backwash tank. As soon as sufficient water enters the backwash tank to open the float valve, water will begin flowing to the pump to mix with the water from the pool drain.

Upon completion of the backwash operation, the multiple control valve on the filter will be adjusted to restore the filter to normal operation, and the water picked up by the pump from the pool drain and the backwash tank, will thereafter be filtered and directed from the filter to the pool.

By adjusting the flow rate from the backwash tank to the pump, as by use of a suitable float valve with restrictive opening, and/or by the use of restrictive piping, so that it takes several hours to empty the backwash tank, a large portion of the dirt in the backwash water will be encouraged to settle out in the bottom of the sack, and the sack cloth will, thereby, have less sediment to remove by filtering action.

In some installations, as when the backwash tank is installed below pool water level, a check valve may be placed in the suction line 23, to prevent reverse flow into the backwash tank during quiescent periods.

Also, since the filter sack unfurls and collapses with changing liquid level, the entire sack will remain submerged until the tank is essentially empty of water. The significance of this lies in the fact that the same amount of sack cloth remains available for filtering at all times, regardless of the water level in the tank, and filtering therefore, will remain uniform over the filtering area of the sack.

Accordingly, because of the ability to remove a goodly portion of the dirt through sedimentation, coupled with the maintenance of uniformity of filtering over the usable area of the sack, several backwash operations can be realized before the necessity arises for cleaning the filter sack.

Inasmuch as the filter sack rests on a surface above the sump, any residual water remaining after closure of the float controlled valve, will have an opportunity to drain into the sump, and the sack with its trapped sediment will then be in condition to dry, before the next backwash operation.

When the filter sack has reached a condition where it requires cleaning or laundering, the dried sack may be handled more expeditiously than a soggy one, and the greater portion of the sediment trapped therein can be shook loose by turning the sack inside out, for example, following which, any sediment clinging to the sack may be removed in large part by brushing or hosing, and if desired, the entire sack may be laundered in a washing machine in a conventional manner.

The addition of some diatomaceous earth to the sack will aid the filtering ability of the sack and permit of increasing the number of backwash cycles between cleanings of the filter sack.

Cleaning and laundering of the filter sack is simplified by the permissible removal of the float ring through loosening of the upper drawstring 13, which may if desired, be made stretchable through the inclusion of a section thereof, of elastic material. In connection with such cleaning and laundering, one may find it desirable to loosen the lower drawstring 14 also.

A cover may be applied to the tank to protect against splashing, the entrance of leaves or other foreign matter, and to prevent a more favorable appearance. Such cover would be provided with a central opening 31 for admission of the backwash water into the tank from the filter.

From the foregoing description of my invention in its preferred form, it will be apparent that the same is subject to alteration and modification without departing from the underlying principles involved, and I accordingly do not desire to be limited in my protection to the specific details illustrated and described, except as may be necessitated by the appended claims.

I claim:
1. A backwash tank assembly comprising
   a tank for receiving backwash water,
   said tank including means on which to rest a filter sack,
   a collapsible filter sack in said tank, with the bottom thereof setting on said rest means,
   means for unfurling and collapsing said sack in accordance with changing liquid level in said tank,
   and means enabling removal of filtrate from said tank.
2. A backwash tank assembly as recited in claim 1, characterized by said filter sack rest means comprising a bottom to said receptacle, said bottom having a sump associated therewith to provide a low point below the elevation of said rest means.
3. A backwash tank as recited in claim 1, characterized by said filtrate removal means including a float controlled valve in said sump, and a discarge connection from said valve, said float controlled valve being adapted to close during lowering of liquid in said tank to that level just prior to exposure of said discharge connection to atmosphere.
4. A backwash tank assembly as recited in claim 1 characterized by said sack unfurling and collapsing
   means including a float, adapted to support the mouth end of said sack at substantially water level in said tank.
5. A backwash tank assembly as recited in claim 4, characterized by said float being in the form of a ring retained within the mouth end of said sack.
6. A backwash tank assembly as recited in claim 5 characterized by said sack having a draw string at the mouth end thereof, for drawing the open end of said sack over said float ring, to retain said ring in position within the mouth end of said sack when said ring is floating.

References Cited

UNITED STATES PATENTS

| 1,803,604 | 5/1931 | Pudycha | 210—242 X |
| 2,414,487 | 1/1947 | Schuttler | 210—359 |
| 3,395,803 | 8/1968 | Sumimoto et al. | 210—122 |

REUBEN FRIEDMAN, *Primary Examiner.*

F. A. SPEAR, JR., *Assistant Examiner.*

U.S. Cl X.R.

210—122, 123, 242